Sept. 10, 1929.  E. A. BARNETT  1,727,532
SPARK PLUG
Filed Dec. 4, 1924
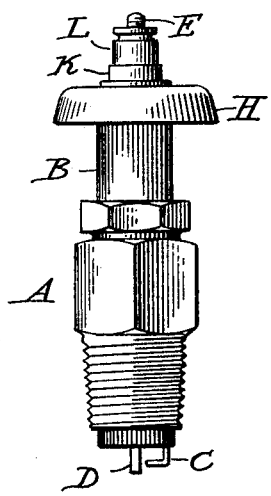
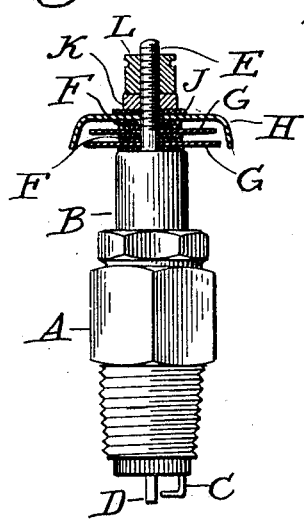
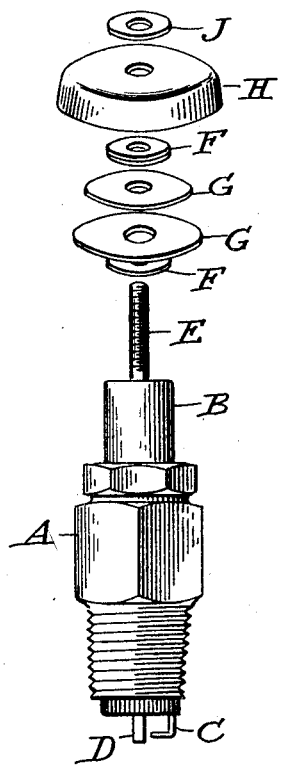
Inventor
E. A. Barnett,
By
Attorney Patented Sept. 10, 1929.

1,727,533

UNITED STATES PATENT OFFICE.

EMERY E. BASHOR, OF BERTHOUD, COLORADO, ASSIGNOR OF ONE-HALF TO MINNIE WRAY, ADMINISTRATRIX OF EDWARD N. WRAY, OF BERTHOUD, COLORADO.

TRACTOR HITCH.

Application filed June 1, 1928. Serial No. 282,130.

This invention relates to improvements in tractor hitches and has reference more particularly to a hitch for use in connection with a tractor when the latter is employed for operating a bull rake. Tractors are becoming increasingly popular but are used as a rule for pulling an implement, as, for example, a plow and for the purpose of hitching tractors to such implements, a large number of hitches have been invented and patented.

During the haying season the farmers in many places of our country employ a rake which is popularly designated as a "bull rake" and which is so constructed that it must be pushed; the horses for this purpose being hitched to the rear of the rake. It is obvious that when a tractor is to be employed for pushing an implement of this type that a special means must be provided for making a connection between the rake and the tractor, and it is to this particular type of tractor hitch that the present invention relates.

This invention, briefly described, consists in a frame which can be readily applied to the tractor or to a truck and which has a frame member extending transversely and which is normally located directly in front of the front axle of the tractor. Secured to this transverse frame member is a substantially U-shaped yoke, whose ends are pivotally mounted in bearings carried by the transverse members. Means is provided for rotating the U-shaped yoke member about its bearings and for locking it in any adjusted position. The pusher frame of the bull rake is attached to the yoke member by means of a universal connection and as this pusher frame is rigidly attached to the frame of the bull rake, the latter can be tilted about the axis of its supporting wheels by rotating the yoke member about its bearings and on account of the universal connection it is possible to turn corners as readily as this can be done if the rake were operated by means of horses.

In order to describe this invention so that its construction and mode of operation can be readily understood, reference will now be had to the accompanying drawings in which the preferred embodiment thereof has been illustrated, and in which:

Fig. 1 is a top plan view of an assembly comprising a bull rake and a tractor and shows the latter equipped with the hitch which forms the subject matter of this invention;

Fig. 2 is a side elevation of the parts shown in Fig. 1 with one front wheel of the tractor removed so as to better disclose the construction;

Fig. 3 is a diagrammatic representation of the parts showing the position assumed in turning a corner;

Fig. 4 is a view showing a similar hitch applied to a truck;

Figure 5:
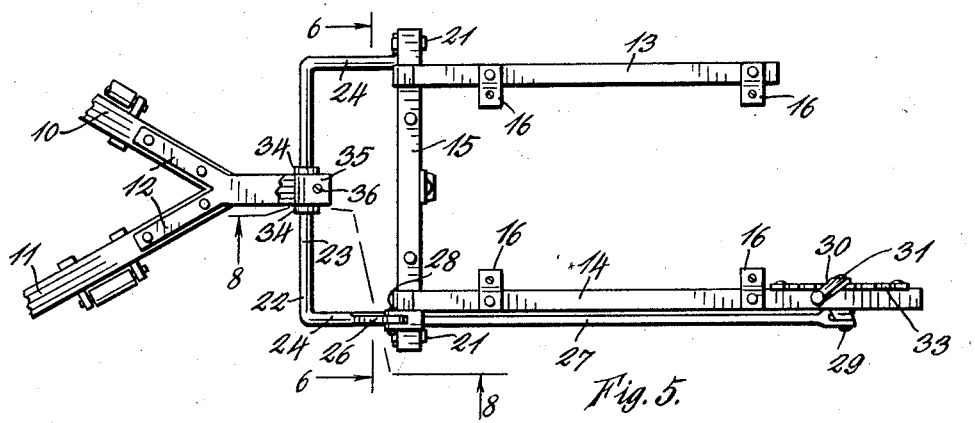
Fig. 5 is a plan view of the hitch frame showing the latter removed from the tractor and showing also a part of the pusher frame.
Figures 6, 7:
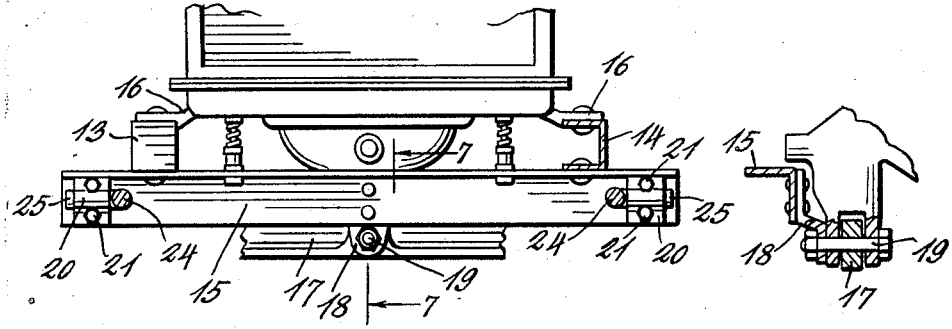
Fig. 6 is a section taken on line 6—6, Fig. 5.
Fig. 7 is a section taken on line 7—7, Fig. 6.
Figure 8:
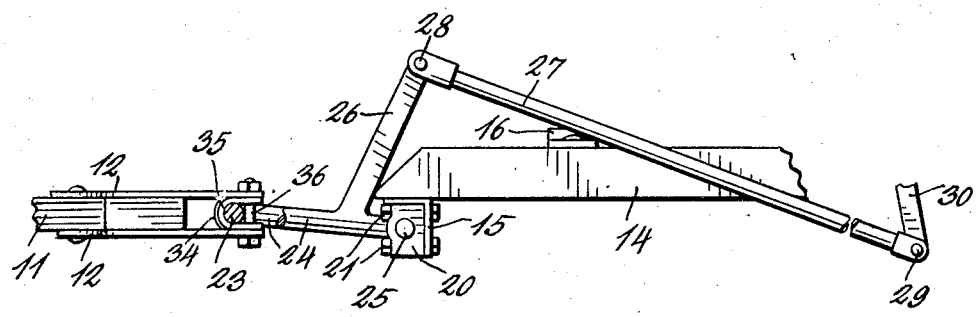
Fig. 8 is a detailed view taken looking in the direction of line 8—8, Fig. 5.

In the drawing numeral 1 designates a tractor and numeral 2 a bull rake. These two implements are of the usual construction and will therefore not be described in any greater detail than necessary for the purpose of properly explaining the invention. The rake comprises a head which is mounted on an axle 3 supported on two spaced wheels 4 and is provided with a large number of teeth 5 whose rear ends are connected to the transverse bar 6. This rake can be tilted about the axis of the wheels from the full line to the dotted line position shown in Figure 2. A guard 7 extends over each of the wheels 4 and for the purpose of preventing the hay from moving rearwardly two bars 8 and 9 are supported in an elevated position directly above and slightly to the rear of the wheels. A pusher frame consisting of two bars 10 and 11 is secured to the rake. These bars have their rear ends connected together by means of metal members 12, one of which is located above and the other below the bars 10 and 11. Secured to the tractor is a frame comprising side members 13 and 14 whose front ends are connected by means of a transverse angle bar 15. The side members 13 and 14 are preferably channels and are each provided with two spaced brackets 16 that are secured to the upper flanges of the channels and are adapted to extend towards the tractor and are secured to the latter by means of the bolts that connect the crank case to the body of the tractor. When this frame is in place, the transverse frame member 15 is located directly to the front of and slightly above the front axle 17. Frame member 15 is provided with a downwardly extending lug 18 that is perforated for the reception of the king bolt 19 in the manner shown quite clearly in Figures 6 and 7. Secured to the transverse frame member 15 are two bearings 20, one of which is located near each end of this member. These bearings are secured in place by means of bolts 21. A yoke member which has been indicated as a whole by numeral 22, has a straight portion 23 and two parallel end members 24. The ends of these end members are bent outwardly so that their axes lie parallel to the straight portion 23 and form journals 25 that extend through openings in the bearings 20. Secured to one of the end members 24 is an arm 26 that extends upwardly and which is connected to one end of the connecting rod 27 by means of a pivot pin 28. This connecting rod extends rearwardly and downwardly and has its lower end connected by means of a pivot pin 29 to the lower end of the lever 30. This lever is pivoted at 31 to the frame member 14 and is provided with a latching mechanism 32 that cooperates with a quadrant 33 carried by the side member 14. It is now evident that when the lever 30 is rotated about its pivot 31, that it will rotate the yoke 22 about its journals so as to rock it from the full line to the dotted line position shown in Figure 2. By means of the latch 32 and the quadrant 33, lever 30 can be secured in any desired position and will hold the yoke member in a corresponding position. For the purpose of making connection between the pusher frame and the yoke member, the latter has been provided with two spaced collars 34 between which is located a short U-shaped strap 35 whose ends are perforated for the reception of the bolt 36. The straps 12 that are attached to the rear end of the pusher frame embrace the U member 35 and are provided with openings for the reception of the bolt 36, all as shown in Figure 8. The collars 34 prevent the U member 35 from sliding longitudinally on the part 23 and the U member 35 is free to rotate about the axis of the member 23 and at the same time the pusher frame can rotate about the axis of the bolt 36. This provides a universal connection between the end of the pusher frame and the yoke so that the latter can be adjusted about the axis of its journals 25 and at the same time permit the bull rake to move with respect to the tractor about the axis of bolt 36.

Let us now assume that the parts are assembled in the manner described and that the rake is to be used for gathering up a load of hay. Lever 30 is adjusted to the position shown in Figure 2 in which position the points of the teeth 5 will come in contact with the ground and as the rake is moved forwardly it will gather up the hay that is resting on the ground. After a load has been gathered and it is desired to transport the same to the stack, the operator grasps lever 30 and moves it rearwardly, thereby rotating the yoke member to the dotted line position in Figure 2 and tilting the rake to the dotted line position. The load can now be quickly transported to the stack where the rake is again tilted to the full line position and the tractor reversed so as to pull the rake out from under the load. In Figure 3 the relationship of the parts in making a turn has been illustrated. It will be seen that owing to the fact that the rake can move about the pivot 36 that there is no binding action when going around a corner as there would be if the rake were rigidly connected with the frame of the tractor. By means of the connection shown, it is evident that the rake can be moved about corners and that it can be very conveniently operated on fields of any size and shape. By means of the simple expedient of rotating the yoke about the journals 25, the rake can be quickly and conveniently tilted, thereby facilitating the operation.

In Figure 4 a modified construction has been shown in which an ordinary truck has been substituted for the tractor. The transverse frame member 15 is secured underneath the front axle 17ª of the truck and the side members 13 and 14ª extend rearwardly and are secured to the chassis frame in the manner shown in this figure.

From the above description it will be apparent that the improved tractor hitch shown and described can be quickly applied to the tractor and removed therefrom and that a bull rake or any other implement that requires to be pushed can be quickly attached thereto and conveniently operated thereby.

Having described the invention what is claimed as new is:

1. In a device of the class described, in combination, a rake head supported on two spaced wheels, a push frame rigidly connected with the rake head and extending rearwardly therefrom, an automotive vehicle, a bail secured to the vehicle at its front end, said bail being movable about a horizontal axis, means for rocking said bail about its axis, means for latching the bail in adjusted position and a universal joint between the rear end of the push frame and the bail.

2. In a device of the class described, in combination, a rake head supported on two spaced wheels, a push frame rigidly connected with the rake head and extending rearwardly therefrom, a tractor, a bail secured to the tractor near its front end, said bail being secured to the tractor by spaced bearings in which it can be oscillated about a horizontal axis, means for moving the bail about its axis of oscillation, means for latching the bail in adjusted position and means for connecting the pusher frame with the bail, said means permitting a universal movement between the bail and pusher frame.

3. A device for use in hitching a tractor to an implement to be pushed, comprising a U-shaped pusher member having the ends of its parallel sides bent outwardly at right angles so as to form journals, a frame member secured to the tractor near its front end, said member having spaced bearings in which the journals are mounted, means for rocking the pusher member about the axis of its journal whereby the position of its front end is adjusted vertically and means for latching the pusher member in adjusted position.

4. In a device of the class described, in combination, a tractor, a frame member secured to the tractor, said frame member extending transversely of the tractor near its front end, means for rigidly securing the frame member to the tractor body, said frame member having two spaced bearings, a U-shaped pusher bar having the ends of its parallel sides bent outwardly and journalled in the bearings, means for rocking the U-shaped pusher member in its bearings and means for latching it in adjusted position.

5. In a device of the class described, in combination, a rake having a rake head provided with teeth, and a pusher frame rigidly secured to the rake head and extending rearwardly therefrom, said rake being supported on two spaced wheels about the axis of which the rake is tilted to bring the ends of the teeth into and out of contact with the ground, a tractor, means for making connection between the rear end of the pusher frame and the front end of the tractor and means for raising and lowering the rear end of the pusher frame for the purpose of tilting the rake so as to bring the rake teeth into and out of contact with the ground.

6. In a device of the class described in combination, a rake having a rake head provided with teeth, and a pusher frame rigidly secured to the rake head and extending rearwardly therefrom, said rake being supported on two spaced wheels about the axis of which the rake is tilted to bring the ends of the teeth into and out of contact with the ground, a tractor, a U-shaped bail pivotally connected with the front of the tractor so as to be free to move about a horizontal axis extending transversely of the tractor, means for rotating the bail about its axis, means for latching it in adjusted position and means for connecting the rear end of the pusher frame with the free side of the bail, whereby when the bail is moved about its axis the rake will be tilted.

In testimony whereof I affix my signature.

EMERY E. BASHOR.